SCRAP REFINING PROCESS AND PRODUCT

Original Filed Aug. 12, 1957 3 Sheets-Sheet 1

Sam Proler
INVENTOR.

BY Murray Robinson
ATTORNEY

SCRAP REFINING PROCESS AND PRODUCT

Original Filed Aug. 12, 1957 3 Sheets-Sheet 2

Sam Proler
INVENTOR.

BY Murray Robinson
ATTORNEY

SCRAP REFINING PROCESS AND PRODUCT

Original Filed Aug. 12, 1957 3 Sheets-Sheet 3

Sam Proler
INVENTOR.

BY Murray Robinson
ATTORNEY

United States Patent Office

Re. 25,034
Reissued Aug. 29, 1961

25,034

SCRAP REFINING PROCESS AND PRODUCT

Sam Proler, Houston, Tex., assignor to Proler Steel Corporation, Houston, Tex., a corporation of Texas Original No. 2,943,930, dated July 5, 1960, Ser. No. 849,116, Oct. 27, 1959, which is a continuation of Ser. No. 677,514, Aug. 12, 1957. Application for reissue Dec. 5, 1960, Ser. No. 73,930
10 Claims. (Cl. 75—44)

Matter enclosed in heavy brackets [ ] appears in the original patent but forms no part of this reissue specification; matter printed in italics indicates the additions made by reissue.

This invention pertains to refined scrap and a method of making same; more particularly it pertains to a process of upgrading contaminated ferrous scrap to make a product more suitable for charging directly or indirectly into a furnace for making iron or steel such as an open hearth furnace, blast furnace, electric furnace, cupola type furnace, for example. This application is a continuation of Serial No. 677,514, filed August 12, 1957, now abandoned.

A particular object of the invention is to convert material heretofore suitable only for making what is known in the trade as a number 2 or number 3 scrap bale into a material equivalent or superior to a number 1 bale of scrap.

A further object of the invention is to effect such a conversion at a cost that is low enough to effect an overall saving in the cost of steel production compared to the use of number 1 scrap bales.

A further object of the invention is to produce a flowable material, analogous to graded hard coal or rock, which can readily be handled by conventional continuous conveyors such as augers or buckets or belts, as distinguished from unitized bales requiring individual handling.

Other objects and advantages of the invention will appear from the following description thereof.

According to a preferred method embodying the invention an appropriate raw material is reduced to a proper size by milling it up until it is cut to a size that will pass a grate having openings somewhat less than a foot square, the resulting shredded material is magnetically separated, the separated more ferrous material is purified by counterflowing it through a rotary kiln heated to about 1300° to 1800° F. at the exhaust end to melt and burn off adhered non-ferrous material, and the resulting clean scrap is compacted while still hot by rolling extrusion. The term "non-ferrous" is used in its broad sense, meaning any material that is not ferrous, whether metallic or not, and covering for example everything from brass to grass, from grease to concrete.

Figure 1A:
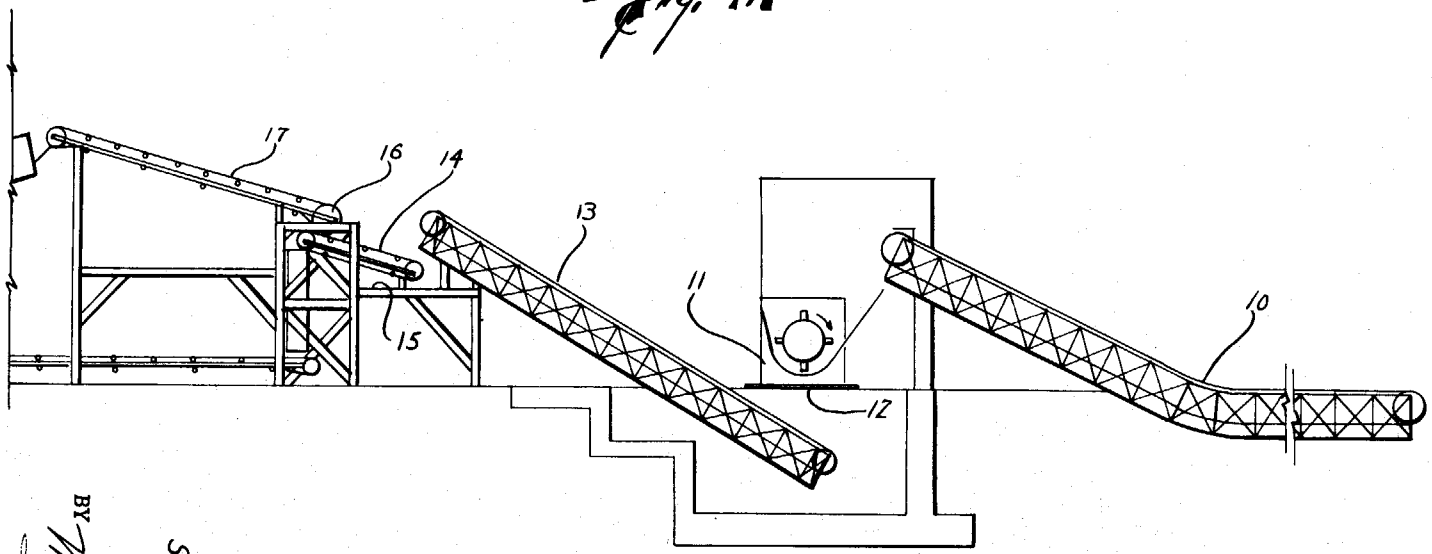
Figure 1B:
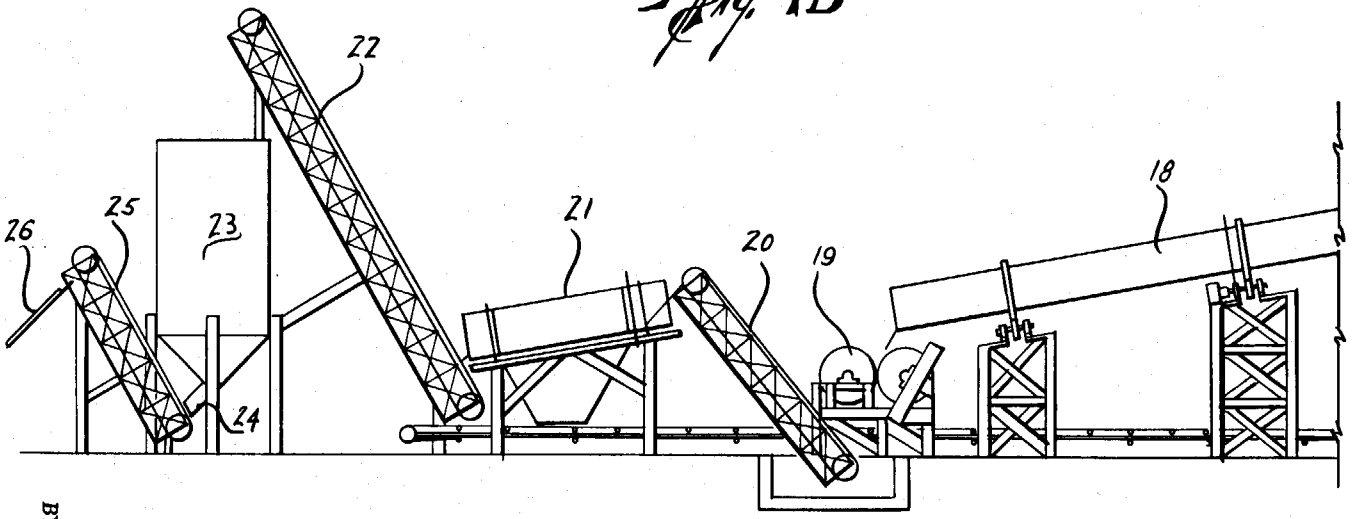
Figure 2:
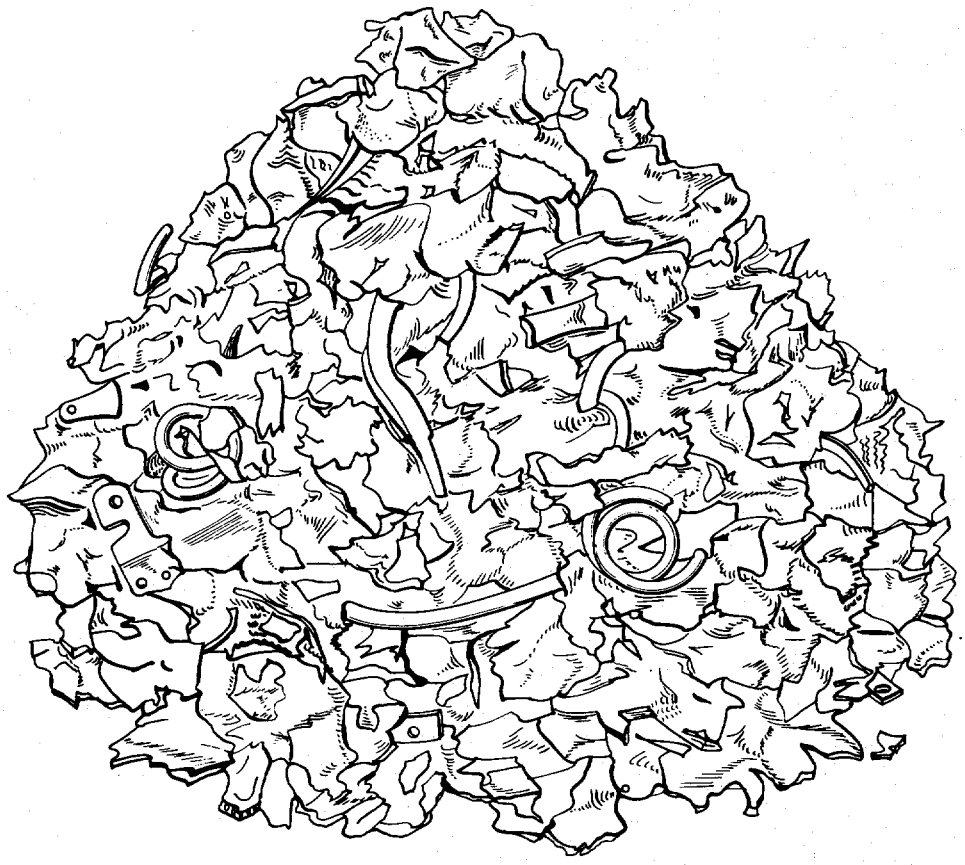

For a more detailed description of the invention reference will now be made to the accompanying drawings wherein:

FIGURES 1A and 1B together constitute a semi-schematic layout of apparatus suitable for carrying out the method of the invention; and FIG. 2 depicts a pile of scrap material made according to the invention.

Referring now to FIGURE 1, the apparatus there shown will be described in order of its operation on the material. An appropriate raw material is placed on apron conveyor 10 at the lower end thereof and carried up to the upper end. An appropriate raw material is any kind of scrap including a goodly proportion (preferably at least about 50% by weight) of heavy gage (28 gage and over) ferrous sheet steel, flat or shaped, such as complete automobiles with or without engines, ice boxes, stoves, washing machines, refrigerators, steel desks, hot water heaters, toys, bicycles, and appliances and parts thereof. Steel in non-sheet form such as wire, rods, shafts, bars, plates, and structural forms may also be present although the more usual raw material will contain less of such material and more of the previously mentioned type for the reason that the latter is usually sufficiently clean to be manually separated and made into a number 1 bale without further treatment. Cast iron and tin plate are undesirable and should not be present in excess of about 5% by weight.

The raw scrap falls off the upper end of the conveyor into the mouth of a reducing means 11 which is preferably of the type known as a hammer mill. There the sheet metal is largely cut and shredded and the other material is cut and shredded and broken until the material is small enough to pass through the openings in grate 12. The openings in grate 12 may be rectangular in shape, preferably having dimensions of 6" by 10", although openings having any shape and a maximum dimension up to 12" are contemplated.

The reduced material falls through grate 12 onto the lower end of apron conveyor 13 and is carried to the upper end thereof where it falls off into a picking belt 14. An operator standing nearby on platform 15 removes from belt 14 such material as is obviously undesirable such as pieces which might interfere with subsequent operations. Also any particularly valuable non-ferrous scrap piece may be removed at this point. The picked over material is carried by belt 14 to magnetic pulley 16 where the more ferrous material is caught and carried up onto belt 17 while the non magnetic material passes under pulley 16 and drops off the end of belt 14. By means of this manual and magnetic separation the free more ferrous scrap is thus separated out from the reduced scrap coming from the hammer mill. Any suitable magnetic separator can be used.

The reduced separated more ferrous scrap falls off the upper end of belt 17 into the upper end of rotary furnace 18 where it is roasted to separate the adhered non-ferrous material from the ferrous. This furnace may be smooth on the interior as in a calcining kiln but preferably is provided with lifting flights as in a dryer so as to tumble the material more effetcively as it is roasted. The furnace is preferably heated by a gas burner at its lower end with the material flowing down through the furnace countercurrent to the hot gas flowing upwardly therethrough in direct contact therewith. A temperature at the burner end of 1300 to 1800 degrees F. is suitable for burning off paper, wood, grease, oil, paint, rubber and other combustibles, melting off tin and lead and other non-ferrous coatings, and cracking off various porcelain and other stone-like finishes.

If desired, the roasted material can next be trommeled to separate the clean ferrous scrap from the freed non-ferrous solid material. However most of the adhered non-ferrous material freed in the roasting operation will be either liquified or volatilized and escape without special attention. Therefore the roasted material can be fed directly from the furnace to rolling mill 19. This is preferable because the material will be hotter if fed directly to the rolling mill.

In mill 19 the hot roasted clean scrap is compacted so that the component pieces are to a certain extent balled up with the result that a somewhat flowable, i.e. only loosely cohering material results. The compacting increases the density of the product from the order of about 25 pounds per cubic foot to the order of about 50 pounds per cubic foot resulting not only in a space saving in transportation but a reduction in the volatilization loss when the material is charged into a steel furnace.

After passing through the compacting rolls the material falls onto the lower end of conveyor 20 which carries it up to the mouth of a rotary screen 21 where it is trommeled. The screen preferably has apertures of about ¼" maximum dimension. As the material descends through the trommel toward its lower end, any remaining fine material freed in the roasting or compacting operations, such as oxides, falls through the holes in the screen away from the main body of the scrap. The trommeling inherently shakes and jars the scrap so as to remove further loosely adhering particles.

If desired the output from the rotary screen can be subjected to a further magnetic separation but it is believed that this will usually be unnecessary and the material falling out of the rotary screen preferably is carried by a conveyor 22 directly to a railroad car or to a storage hopper 23. As desired the final product can be removed from the bottom of the hopped by opening a gate in the outlet 24 thereof whereby the material will be discharged onto the lower end of conveyor 25. The material will be deposited by conveyor 25 into chute 26 leading to a railroad car, truck, or other transportation device.

The product resulting from the above described process is shown in FIGURE 2. It is a high quality material suitable for charging all types of steel furnaces. By virtue of the process it is substantially free of loose and adhered nonferrous material and has a maximum piece dimension less than one foot with the possible exception of a few bars which may have escaped cutting into shorter lengths in the hammer mill and gone through its grate end-wise. It will have a density of at least 50 pounds per cubic foot and usually more in the vicinity of 60 pounds per cubic foot or even higher. By virtue of the choice of feed material, the minimum dimension of the product is not less than 28 gage, i.e. 0.0149 inch. Also, by excluding a majority of plated products such as tin cans the product will be substantially free of absorbed non-ferrous material. In summary, by use of a suitable raw material and the process according to the invention there is produced at low cost a refined scrap material product that is comparable or superior to number 1 scrap bales for which there is great demand as a furnace charging material. The material is suitable for either direct feed into a steel furnace, or into hot metal from a blast furnace or into a blast furnace directly along with the ore to increase the yield. It is suitable for use in all types of furnaces.

While a preferred embodiment of the invention has been shown and described, many modifications thereof can be made by one skilled in the art without departing from the spirit of the invention and it is desired to protect by Letters Patent all forms of the invention falling within the scope of the following claims:

1. Process of refining a raw ferrous bearing scrap material comprising shredding the raw material, separating the more ferrous bearing shredded material from the less ferrous bearing shredded material, roasting the more ferrous bearing shredded material at a temperature sufficient to remove substantially all non-ferrous metals, and individually compacting and balling up the pieces of the more ferrous bearings shredded material to densify it while maintaining the individuality of the separate pieces, whereby a fluent mass is obtained.

2. The product of the process of claim 1.

3. Process of upgrading junkyard type raw ferrous scrap such as automobiles to a fluent bulk furnace charging material comprising milling the raw scrap to a reduced piece size, magnetically separating the more ferrous milled scrap from the less ferrous milled scrap, roasting the more ferrous milled scrap at a temperature sufficient to separate substantially all adhered non-ferrous materials, and individually compacting and balling up the pieces of the roasted ferrous scrap while below the welding temperature of steel to densify the roasted ferrous scrap while maintaining the individuality of the separate pieces sufficient to keep the final product fluent.

4. Process of upgrading junkyard type raw ferrous scrap such as automobiles, having at least a large proportion of sheet material of at least 28 gage and no more than a small proportion of plated material, to a fluent bulk furnace charging material comprising cutting, shredding, and breaking the raw scrap to a reduced piece size, magnetically separating the more ferrous pieces of scrap from the less ferrous pieces of scrap, roasting the more ferrous pieces of scrap at a temperature sufficient to burn, melt, evaporate, and crack off substantially all adhered non-ferrous materials, and separately compacting and balling up the individual pieces of the roasted scrap while below the welding temperature for steel to densify the bulk roasted scrap while maintaining the individuality of the separate pieces sufficient to keep the final product fluent.

5. A process as defined by claim 4, wherein the magnetic separation step is repeated after the roasting step.

6. Process of refining a raw ferrous bearing scrap material comprising reducing the piece size of the raw material, separating the more ferrous pieces of material from the less ferrous pieces of material, roasting the more ferrous pieces of material at a temperature sufficient to separate substantially all adhered non-ferrous materials from the ferrous pieces, and separately passing the individual ferrous pieces through a rolling mill.

7. Process as defined by claim 6 wherein a fluent mass having a density of at least about 50 pounds per cubic foot is formed.

8. Process of upgrading junkyard type raw ferrous scrap such as automobiles, having at least a large proportion of sheet material of at least 28 gage and no more than a small proportion of plated material, to a fluent bulk furnace charging material, comprising milling the raw scrap to a piece size small enough to pass a grate of no larger than one foot opening size, magnetically separating the more ferrous milled scrap from the less ferrous milled scrap, roasting the more ferrous milled scrap at a temperature in the range of 1300 to 1800 degrees F., and individually compacting and balling up the pieces of the roasted scrap while below the welding temperature for steel to increase the density of the bulk roasted scrap while maintaining the individuality of the separate pieces sufficient to keep the final product fluent.

*9. Process of refining a raw ferrous bearing scrap material comprising shredding the raw material, separating the more ferrous bearing shredded material from the less ferrous bearing shredded material, and individually compacting and balling up the pieces of the more ferrous bearing shredded material to densify it while maintaining the individuality of the separate pieces, whereby a fluent mass is obtained.*

*10. Process of refining a raw ferrous bearing scrap material comprising shredding the raw material, separating the more ferrous bearing shredded material from the less ferrous bearing shredded material, and separately passing the pieces of the more ferrous bearing shredded material individually through a rolling mill.*

References Cited in the file of this patent or the original patent

UNITED STATES PATENTS

| | | |
|---|---|---|
| 1,012,871 | Lentz | Dec. 26, 1911 |
| 1,526,400 | Waldmann | Feb. 17, 1925 |
| 1,725,780 | Chamberlain | Aug. 27, 1929 |
| 2,059,229 | Gregg | Nov. 3, 1936 |
| 2,150,984 | Near et al. | Mar. 21, 1939 |
| 2,804,295 | Brooke | Aug. 27, 1957 |